United States Patent
Kumar et al.

(10) Patent No.: US 12,468,515 B2
(45) Date of Patent: Nov. 11, 2025

(54) CONTAINERIZED NETWORK FUNCTION DEPLOYMENT DURING RUNTIME RESOURCE CREATION

(71) Applicant: Verizon Patent and Licensing Inc., Basking Ridge, NJ (US)

(72) Inventors: Abhishek Kumar, Bangalore (IN); Ravi Potluri, Coppell, TX (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1231 days.

(21) Appl. No.: 17/190,507

(22) Filed: Mar. 3, 2021

(65) Prior Publication Data

US 2022/0283792 A1    Sep. 8, 2022

(51) Int. Cl.
  *G06F 8/60*    (2018.01)
  *G06F 9/455*   (2018.01)
  *H04L 41/046*  (2022.01)
  *H04L 41/40*   (2022.01)

(52) U.S. Cl.
  CPC ............ *G06F 8/60* (2013.01); *G06F 9/45558* (2013.01); *H04L 41/046* (2013.01); *H04L 41/40* (2022.05)

(58) Field of Classification Search
  CPC .............. H04L 41/0895; H04L 41/0806; H04L 41/0816; H04L 41/40; H04L 41/046; G06F 8/60; G06F 9/45558
  See application file for complete search history.

(56) References Cited

U.S. PATENT DOCUMENTS

| | | | | |
|---|---|---|---|---|
| 7,451,201 B2* | 11/2008 | Alex | ................... | H04L 43/0817 715/734 |
| 7,912,955 B1* | 3/2011 | Machiraju | ............. | G06F 9/5077 709/221 |
| 8,024,772 B1* | 9/2011 | Yehuda | ............... | H04L 41/0893 726/1 |
| 8,065,676 B1* | 11/2011 | Sahai | .................... | G06F 9/5077 718/1 |
| 8,141,090 B1* | 3/2012 | Graupner | .............. | G06F 9/5077 718/1 |

(Continued)

*Primary Examiner* — Muhammad Raza (57) ABSTRACT

Systems and methods described herein provide a Specialized-Operator enabled with admission control functionalities and Custom Resource Definition (CRD) plugins responsible for improving the reliability of the CNF Lifecycle Management operations for deploying containerized workloads on any heterogeneous cloud platform or in multicluster environments. According to one implementation, a computing device includes a sensor Network Function Virtualization (NFV)-extension and an actuator NFV-extension. The sensor NFV-extension obtains, from a Container Infrastructure Service Manager (CISM), an event signal that indicates a deficiency with a customer Containerized Network Function (CNF) deployment; detects a current state for the CNF deployment; determines an intent for the CNF deployment; identifies, based on the intent, a desired state for the CNF deployment; and selects, from a group of available actuator NFV-extensions, the actuator NFV-extension corresponding to the desired state. The actuator NFV-extension may be configured to initiate remediation of the CNF deployment to the desired state.

20 Claims, 8 Drawing Sheets

(56) References Cited

U.S. PATENT DOCUMENTS

| | | | |
|---|---|---|---|
| 8,561,089 B2* | 10/2013 | Leff | G06F 9/547 |
| | | | 719/330 |
| 8,973,090 B1* | 3/2015 | Banerjee | G06F 21/51 |
| | | | 726/1 |
| 9,282,005 B1* | 3/2016 | Yehuda | H04L 41/065 |
| 9,910,696 B2* | 3/2018 | Dow | G06F 9/45558 |
| 10,992,543 B1* | 4/2021 | Rachamadugu | H04L 41/0853 |
| 12,020,055 B2* | 6/2024 | Yang | G06F 9/45558 |
| 2006/0069864 A1* | 3/2006 | Dalal | G06F 3/0605 |
| | | | 711/114 |
| 2009/0125920 A1* | 5/2009 | Leff | G06F 9/547 |
| | | | 719/330 |
| 2015/0052095 A1* | 2/2015 | Yang | G06N 5/02 |
| | | | 706/47 |
| 2018/0262394 A1* | 9/2018 | Sakura | H04L 67/12 |
| 2018/0351806 A1* | 12/2018 | Mohanram | H04L 41/0895 |
| 2019/0104125 A1* | 4/2019 | Dearment | H04L 63/10 |
| 2020/0228880 A1* | 7/2020 | Iyer | H04N 21/251 |
| 2020/0287724 A1* | 9/2020 | Vaddi | H04L 9/0894 |
| 2021/0099450 A1* | 4/2021 | Jain | H04L 63/0823 |
| 2021/0117241 A1* | 4/2021 | Xia | G06F 9/45558 |
| 2021/0250230 A1* | 8/2021 | Johnson | H01Q 3/005 |
| 2021/0326167 A1* | 10/2021 | Yang | G06F 9/5077 |
| 2021/0392047 A1* | 12/2021 | Jamkhedkar | H04L 41/145 |
| 2021/0409346 A1* | 12/2021 | Thoemmes | H04L 47/788 |
| 2022/0012080 A1* | 1/2022 | Shepherd | G06F 9/45545 |
| 2022/0075666 A1* | 3/2022 | Xia | H04L 67/51 |
| 2022/0129539 A1* | 4/2022 | Walsh | G06F 21/54 |
| 2022/0303331 A1* | 9/2022 | Svennebring | H04N 21/44209 |
| 2023/0083063 A1* | 3/2023 | Badrinath | H04L 41/5019 |
| | | | 709/223 |
| 2023/0239212 A1* | 7/2023 | Haldin | H04L 41/0859 |
| | | | 709/220 |
| 2023/0342183 A1* | 10/2023 | Xia | H04L 41/40 |

* cited by examiner

CONTAINERIZED NETWORK FUNCTION DEPLOYMENT DURING RUNTIME RESOURCE CREATION

BACKGROUND

Software-defined networking and/or network function virtualization may allow network functions of a wireless telecommunications network to execute from reconfigurable resources of function-agnostic hardware. Function-agnostic hardware may be offered by service providers in different platforms, such as a Containers as a Service (CaaS) platform.

A CaaS platform may be used by software developers and other customers to upload, organize, run, scale, manage and stop containers by using virtual containers or Containerized Network Functions (CNFs). Service providers providing a CaaS platform may provide a requisite network infrastructure, support software from different CNF vendors, and provide service assurances.

DETAILED DESCRIPTION OF THE PREFERRED EMBODIMENTS

The following detailed description refers to the accompanying drawings. The same reference numbers in different drawings may identify the same or similar elements.

When a vendor Containerized Network Function (CNF) package is deployed, the deployment usually needs to be adapted to the vendor software and also adapted with the common services that a service provider's Containers as a Service (CaaS) platform offers. However, it can be burdensome for a service provider to update the vendor code for each software release coming from the vendor. In addition, runtime validations on the CNF need to be performed, to assert the presence of variety of factors at the time of CNF deployment, such as (a) interoperability with CaaS toolsets based on the standard sets of labels and annotations, and (b) use-cases related to sidecar injections, processing/memory resource requirements for sidecars, and CNF naming standards and real-time analysis on health check status of the CNFs.

Systems and methods described herein provide a Specialized-Operator enabled with admission control functionalities and Custom Resource Definition (CRD) plugins responsible for improving the reliability of the CNF Lifecycle Management operations for deploying containerized workloads on any heterogeneous cloud platform or in multi-cluster environments. According to one implementation, a computing device includes a communication interface to communicate with network devices; a sensor Network Function Virtualization (NFV)-extension, and an actuator NFV-extension. The sensor NFV-extension may be configured to: obtain, from a Container Infrastructure Service Manager (CISM), an event signal that indicates a deficiency with a customer Containerized Network Function (CNF) deployment; detect a current state for the CNF deployment; determine an intent for the CNF deployment; identify, based on the intent, a desired state for the CNF deployment; and select, from a group of available actuator NFV-extensions, an actuator corresponding to the desired state. The actuator NFV-extension may be configured to initiate remediation of the CNF deployment to the desired state.

The system and methods may use plugins as an adapter for CNF Orchestration activities. The system and methods also include Custom Resource Definitions which may be ingested as custom labels and annotations. The system and methods further include operators with some additional plugins in order to perform the runtime validation on the CNF resources as per defined Policy rules.

Figure 1:
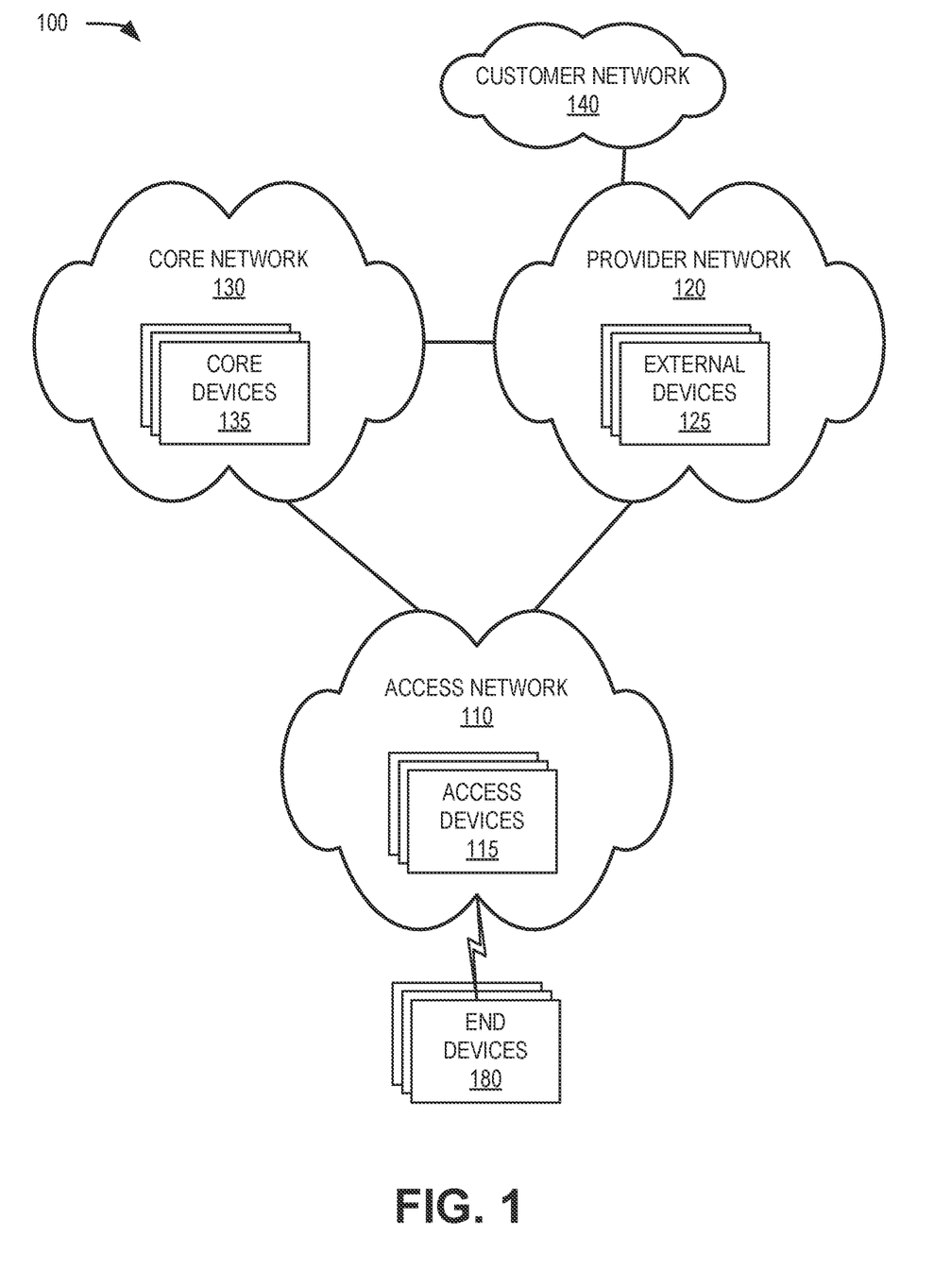
FIG. 1 is a diagram illustrating an exemplary network environment in which systems and methods described herein may be implemented.

FIG. 1 is a diagram illustrating an exemplary environment 100 in which a Containerized Network Function (CNF) deployment validation service may be implemented. As illustrated, environment 100 includes access network 110, a provider network 120, a core network 130, and a customer network 140. Access network 110 includes access devices 115 (also referred to individually or generally as access device 115). Provider network 120 includes external devices 125 (also referred to individually or generally as external device 125). Core network 130 includes core devices 135 (also referred to individually or generally as core device 135). Environment 100 further includes end devices 180 (also referred to individually or generally as end device 180).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 180 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 180 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary. Environment 100 may also include various planes of communication including, for example, a control plane, a user plane, a service plane, and/or a network management plane. Environment 100 may include other types of planes of communication.

Access network 110 may include one or multiple networks of one or multiple types and technologies. For example, access network 110 may be implemented to include a 5G-access network (5G-AN) or a 5G-radio access network (RAN), a future generation RAN (e.g., a 6G RAN or subsequent generation RAN). Access network 110 may also include a legacy RAN (e.g., a Third Generation (3G) RAN, a 4G or 4.5 RAN, etc.). Access network 110 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 110, provider network 120, and/or core network 130.

Depending on the implementation, access network 110 may include one or multiple types of network devices, such as access devices 115. For example, access device 115 may include a next generation Node B (gNB), an evolved Long Term Evolution (eLTE) evolved Node B (eNB), an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 115 may include a wired and/or optical device (e.g., modem, wired access point, optical access point, Ethernet device, etc.) that provides network access.

Provider network 120 may include one or multiple networks of one or multiple types and technologies. For example, provider network 120 may be implemented to include a service or an application-layer network, a cloud network, a private network, a public network, a multi-access edge computing (MEC) network, a fog network, the Internet, a service provider network, the World Wide Web (WWW), an Internet Protocol Multimedia Subsystem (IMS) network, a Rich Communication Service (RCS) network, software defined network (SDN), a virtual network, a packet-switched network, a data center, or other type of network that may provide access to and may host an end device application, service, or asset (also referred to as an "application service"). According to an exemplary embodiment, provider network 120 may include the CNF deployment validation service, as described herein.

Depending on the implementation, provider network 120 may include various network devices such as external devices 125. For example, external devices 125 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

Core network 130 may include one or multiple networks of one or multiple network types and technologies. Core network 130 may include a complementary network of access network 110. For example, core network 130 may be implemented to include a Next Generation Core (NGC or 5GC) network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network. According to an exemplary embodiment, core network 130 may include the CNF deployment validation service, as described herein.

Depending on the implementation of core network 130, core network 130 may include various types of network devices that are illustrated in FIG. 1 as core devices 135. For example, core devices 135 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network data analytics function (NWDAF), an application function (AF), a mobility management entity (MME), and a packet gateway (PGW). According to other exemplary implementations, core devices 135 may include additional, different, and/or fewer network devices than those described.

Customer network 140 may include a wide area network (WAN), a Layer 2 and/or Layer 3 LAN, an enterprise network, or a combination of networks associated with a customer of provider network 120.

End devices 180 include a device that may have computational and/or communication capabilities (e.g., wireless, wired, optical, etc.). End device 180 may be implemented as a mobile device, a portable device, a stationary device (e.g., a non-mobile device), a device operated by a user, or a device not operated by a user. For example, end device 180 may be implemented as a smartphone, a mobile phone, a personal digital assistant, a tablet, a netbook, a phablet, a wearable device (e.g., a watch, glasses, etc.), a computer, a gaming device, a music device, an Internet of Things (IoT) device, a drone, a smart device, or other type of wireless device (e.g., other type of user equipment (UE)). End device 180 may be configured to execute various types of software (e.g., applications, programs, etc.). The number and the types of software may vary among end devices 180.

Figure 2:
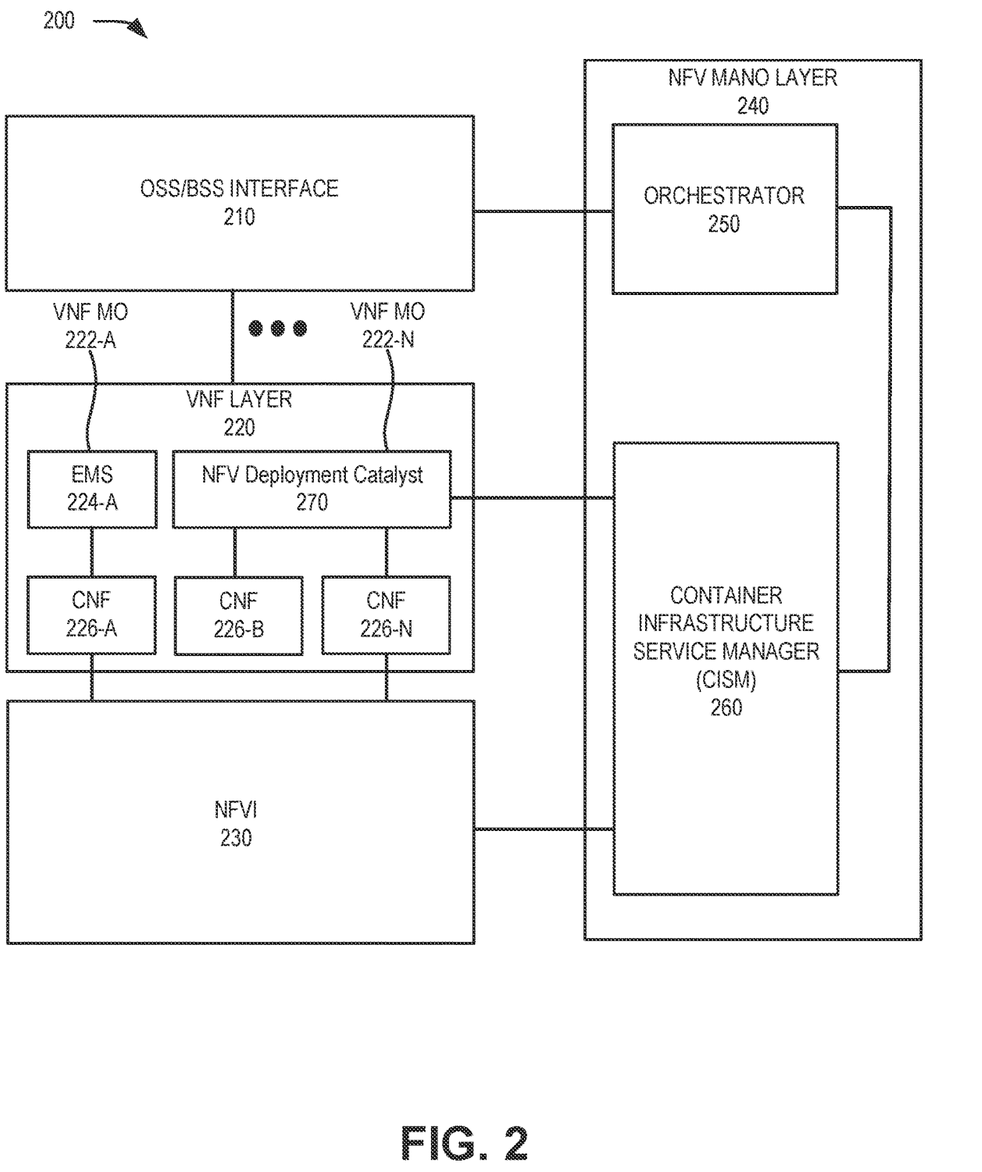
FIG. 2 is a diagram illustrating a container virtualization platform within the environment of FIG. 1 in which a Containerized Network Function (CNF) deployment validation service may be implemented.

FIG. 2 is a diagram illustrating a container virtualization orchestration platform 200 in which the CNF deployment validation service may be implemented. Virtualization orchestration platform 200 may be included, in provider network 120 and/or core network 130, for example. According to exemplary embodiment, virtualization orchestration platform 200 may be an Open Network Automation Platform (ONAP) framework-based network. According to other exemplary embodiments, virtualization orchestration platform 200 may be implemented in a non-ONAP-based network.

As shown in FIG. 2, virtualization orchestration platform 200 may include an operations support system/business support system (OSS/BSS) interface 210, a virtual network function (VNF) layer 220, an NFV Infrastructure (NFVI) 230, and an NFV management and organization (MANO) layer 240.

OSS/BSS interface 210 may interface with OSS systems, such as a network monitoring system, a network provisioning system, a network management system, a testing system, and/or other types of OSS systems. Furthermore, OSS/BSS interface 210 may interface with BSS systems, such as an ordering system, a customer service system, and/or a billing system. OSS/BSS interface 210 may enable the OSS and BSS systems to manage the virtualized components of access network 110, provider network 120, and/or core network 130. Furthermore, OSS/BSS 210 may interface with a Self-Organizing and/or Self-Optimizing Network (SON) system to perform planning, configuration, management, optimization, and/or healing of access network 110, provider network 120, and/or core network 130.

VNF layer 220 may include VNF Managed Objects (MOs) 222-A to 222-N. Each VNF MO 222 may correspond to an instance of a VNF MO of a particular type. For example, VNF MO 222 may include an Element Management System (EMS 224) and a CNF 226. EMS 224 may manage VNF MO 222 and CNF 226 may include the implementation of containerized functions partitioned by the VNF MO 222. NVFI 230 may include hardware (e.g., processors, memory, storage components, networking components, etc.) and software components on which VNF MOs 222 are deployed. For example, NVFI 230 may include the hardware and software components included in a cloud computing system or MEC network of provider network 120.

NFV MANO layer 240 may correspond to a European Telecommunications Standards Institute (ETSI) NFV MANO architecture or another MANO architecture. NFV MANO layer 240 may include an orchestrator 250 and a Container Infrastructure Service Manager (CISM) 260. Orchestrator 250 may perform orchestration of NFV to ensure that sufficient resources are available to provide a network service and that a particular network function is deployed, changed, or removed. Thus, orchestrator 250 may coordinate requests received via OSS/BSS interface 210 with CISM 260.

CISM 260 may manage VNF MOs 222. For example, CISM 260 may configure virtualized components, hardware, and/or underlying network components to support CaaS requests. According to implementations described herein, NFV Deployment Catalyst 270 may include NFV extensions for CISM 260 to provide admission control functionalities and Custom Resource Definition (CRD) plugins responsible for improving the reliability of the CNF Lifecycle Management operations. According to one implementation, NFV Deployment Catalyst 270 may be implemented as a Policy Decision Point (PDP) in an IETF policy-driven management model. The PDP may be considered a processing engine that evaluates requests and retrieves applicable policies, and other knowledge as reference, to provide a final decision. Policies for a given domain can execute in a PDP group. The PDP groups may have PDP sub-types to within a group to execute the policy definition. In one implementation, NFV Deployment Catalyst 270 may represent a PDP sub-type for operators (PDP-O) and may be installed as a cloud-native plug-in.

Although FIG. 2 shows exemplary components of virtualization orchestration platform 200, in other implementations, virtualization orchestration platform 200 may include fewer components, different components, additional components, or differently arranged components than depicted in FIG. 2. Additionally or alternatively, one or more components of virtualization orchestration platform 200 may perform one or more tasks described as being performed by one or more other components of virtualization orchestration platform 200.

Figure 3:
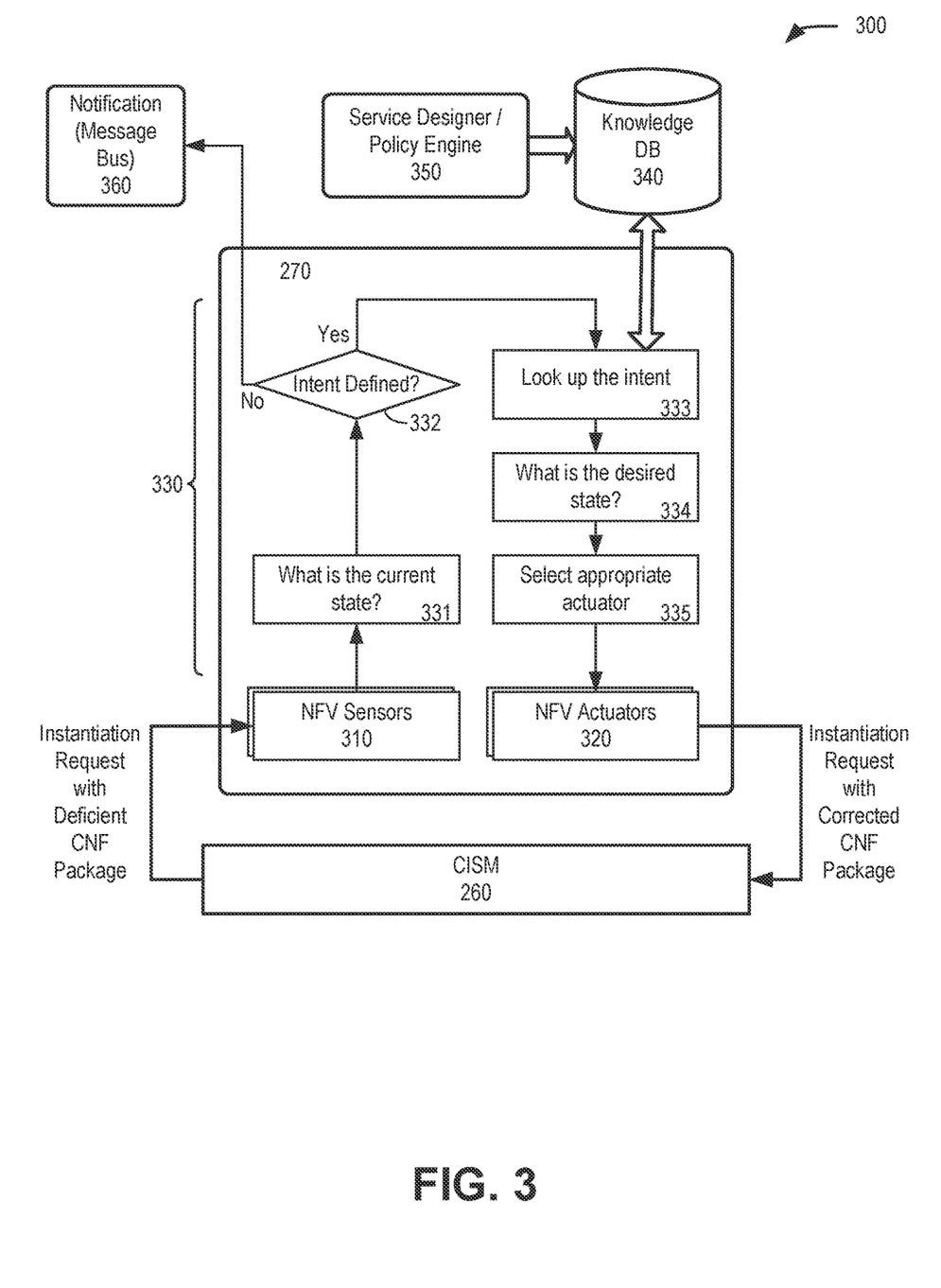
FIG. 3 is a diagram illustrating use of Network Function Virtualization (NFV) Deployment Catalyst to validate container deployments in a portion of the virtualization platform of FIG. 2.

FIG. 3 is a diagram illustrating use of NFV Deployment Catalyst 270 to validate container deployments in a portion 300 of virtualization orchestration platform 200. NFV Deployment Catalyst 270 employs various sensors 310 which in turn perceive events thereby triggering stimuli by corresponding actuators 320. Sensors 310 and actuators 320 may be implemented, for example, as Network Function Virtualization (NFV)-extensions. According to an implementation, NFV Deployment Catalyst 270 may operate in a WebScale environment.

In contrast with overall life cycle management functions of CISM 260, for example, NFV Deployment Catalyst 270 may assist CISM 260 for specific deployment and runtime events. Defects or deficiencies may be initially present in a CNF package received by orchestrator 250, for example. These defects/deficiencies in the CNF package may be propagated to CISM 260 via an instantiation request (which may include all or a portion of the CNF package). For example, if appropriate labels or variations are not defined in a vendor's application package, application onboarding may typically fail and require manual intervention. According to implementations described herein, NFV Deployment Catalyst 270 may perform validations for an application package supported with CNFs and automatically detect/mitigate deficiencies.

Sensors 310 may be agents (e.g., controllers) that detect events originating from CISM 260. Actuators 320 may be controllers that trigger stimulus to take corrective action or recovery action based on input from sensor 310. When CISM 260 identifies an issue with executing an instantiation request, for example, CISM 260 may forward the instantiation request (e.g., including the underlying CNF package) to one of sensors 310 in NFV Deployment Catalyst 270. For example, CISM 260 may detect that a required field (e.g., the presence of a required label or setting) in a CNF package associated with the instantiation request is missing. CISM 260 may forward the instantiation request and/or corresponding CNF package to one of sensors 310 for evaluation. Sensors 310 may interface with actuators 320 to resolve/mitigate deficiencies in the instantiation request. As shown in FIG. 3, sensor 310 may generally implement a control loop 330 to trigger stimuli for actuators 320.

Control loop 330 may include determining the current state of the environment (block 331). For example, sensor 310 may receive an instantiation request for a CNF to support an application. Sensor 310 may determine the current state of the network environment, such as whether the requested CNF package includes certain labels, annotations, public key infrastructure (PKI) settings for a particular sensor.

Control loop 330 may include determining if an intent is defined (block 332). For example, sensor 310 may inspect the instantiation request to determine if an intent is defined. Intent may be determined, for example, based on requirements or policies selected for an application and included in a vendor's submission package. If a customer indicates certain policies are to be available for a network function, sensor 310 may determine if those policies are properly defined with appropriate labels, annotations, etc. An example of an intent would be that a CNF Deployment Release must include all the labels added to the deployment as part of the CNF Attestation Process. Another example of an intent may be to ensure a guaranteed quality-of-service (QoS) class for all of the CNF workloads including Sidecars targeted for 5G NFs, and/or MEC apps. The term sidecar refers to a utility container in NFVI 230 which adds functionality to support the NFVI. As another example, there may be intent for auto-rotation of the PKI Certificates for the pods that do not require 3GPP compliant Service-based Interfaces. Another example of intent may be to ensure 99.999% availability of CNF applications, where the container virtualization platform should auto-heal the applications.

If an intent is not defined (block 332—No), control loop 330 may provide a notification or alert message via a notification system 360. For example, sensor 310 may issue a notification via a message bus of virtualization orchestration platform 200. If an intent is defined (block 332—Yes), control loop 330 may include looking up the intent (block 333), and determining the desired state for the intent (block 334). For example, sensor 310 may refer to knowledge database 340 to identify intents defined in knowledge database 340. Knowledge database 340 may include information from a Service Designer/Policy Engine 350. Service Designer/Policy Engine 350 may design NFV services and the various constants for an application which are necessary to ensure an application can run successfully in the cloud. Service Designer/Policy Engine 350 may feed that information to knowledge database 340. For a given intent, sensor 310 will find the corresponding intent from knowledge pool 340, and accordingly, determine the desired/expected state for the intent.

Control loop 330 may also include selecting an appropriate actuator (block 335). For example, based on the difference between the current state and the desired/expected state, sensor 310 may select a corresponding actuator to initiate remediation of the CNF deployment to the desired state. For a given intent, sensor 310 may identify the correct actuator 320 to take the necessary actions to mitigate the issues. As an example, sensor 310 may determine that certain labels are missing for an instantiation request with certain policies and identify an actuator 320 associated with providing labels.

Actuators 320 may perform various operations to resolve an instantiation request with a deficient CNF package (e.g., as indicated by sensor 310), such as performing automated remediation, alerts/notifications, and admission control. For automated remediation, some actuators 320 may be configured to inject the labels which are missing from an instantiation request. That is, once selected by sensor 310, an actuator 320 may identify the missing label, identify a default value for the label as defined in the policy, and automatically inject the label into the instantiation request. Actuators 320 may also provide alerts or notifications to external systems to identify changes and or unresolved issues with an instantiation request. Actuators 320 may also perform admission control functions based on results of control loop 330.

Figure 4:
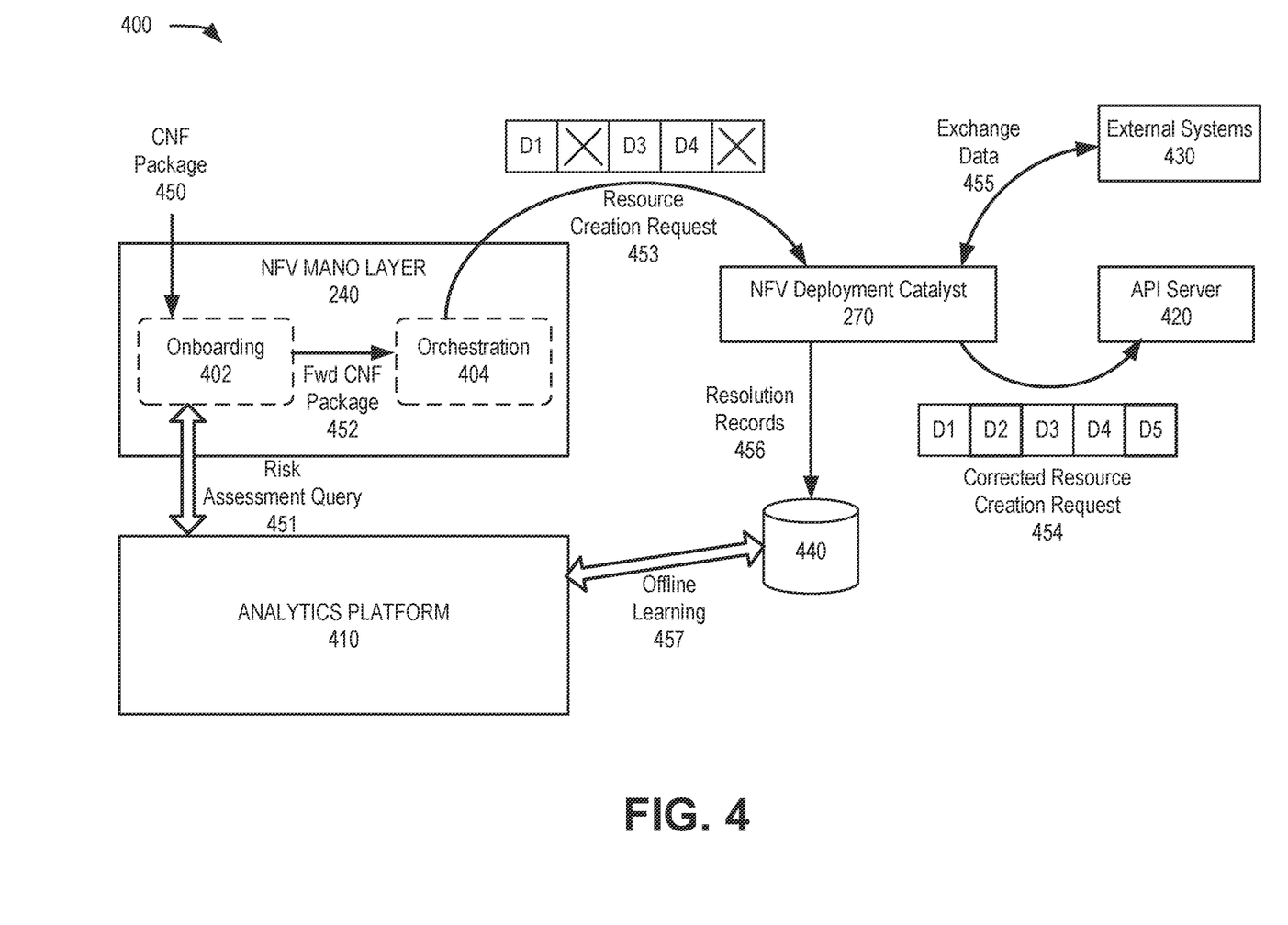
FIG. 4 is a diagram illustrating communications in a network portion that includes NFV Deployment Catalyst of FIG. 3.

FIG. 4 is a diagram illustrating communications or a feedback loop in a network portion 400 that includes NFV Deployment Catalyst 270. As shown in FIG. 4, network portion 400 may include NFV MANO Layer 240, NFV Deployment Catalyst 270, an analytics platform 410, an application programming interface (API) server 420, and external systems 430.

Analytics platform 410 may review the structure, syntactic grammar, integrity, features, security, release history, configuration, and/or other aspects of the CNF against known validation criteria. Analytics platform 410 may determine operational risk of a CNF based on the review and may permit deployment of the network functions of that CNF from available configurable resources when the operational risk is deemed acceptable. For example, analytics platform 410 may generate a compliance score for a requested CNF.

API server 420 may include a network device or computing device to implement instructions for instantiating CNFs. In one implementation, API server 420 may be configured as a Kubernetes server. NFV MANO Layer 240 may include an onboarding platform 402 and an orchestration framework 404 (including, e.g., orchestrator 250 and CISM 260) which perform functions described further herein. External systems 430 may include one or more network functions and/or devices that coordinate with the CNF deployment validation service to inform, update, and/or resolve network configurations based on CNF deployments. Deployment policy repository 440 may include a memory or data structure to record and store actions by NFV Deployment Catalyst 270.

In operation, onboarding platform 402 of NFV MANO Layer 240 may receive incoming CNF packages 450 for deployment. Prior to deployment of the CNF package, onboarding platform 402 may query 451 analytics platform 410 to determine a risk associated with each CNF package (e.g., a probability of a successful deployment, given the current configuration information). Assuming an acceptable risk score, onboarding platform 402 may forward 452 the CNF package to the orchestration framework 404. Orchestration framework 404 may make a CNF Resource Creation Request 453 (which may include the CNF package data received from onboarding platform 402) for the API server 420 to instantiate the CNF. NFV Deployment Catalyst 270 may be positioned to intercept the Resource Creation Request 453 from orchestration framework 404 and determine a current state of the request. As described in connection with FIG. 3, for example, NFV Deployment Catalyst 270 may determine an intent for the request (e.g., based on the CNF package data) and refer to knowledge database 340 to determine the desired state for the incoming request. In the example of FIG. 4, NFV Deployment Catalyst 270 may identify an actual state that the Resource Creation Request 453 requires five labels (e.g., D1-D5) associated with a particular application that is the subject of the incoming request, but that two labels (e.g., D2 and D5) are missing. The labels may be, for example, proprietary service provider labels that are needed to allow a vendor application package to properly interface with provider network 120. NFV Deployment Catalyst 270 (e.g., actuator 320) may automatically populate the missing labels/annotations (e.g., D2 and D5) in to the CNF package of the incoming request and forward the corrected Resource Creation Request 454 to API server 420. Thus, NFV Deployment Catalyst 270 may avoid the delay of manual insertion of the missing labels.

In another aspect, depending on the type of incoming request, NFV Deployment Catalyst 270 may exchange information 455 with external systems 430 for assurance, service orchestration (SO), PKI, etc. For example, NFV Deployment Catalyst 270 may synchronize data, pull information from, or push information to external systems 430 to facilitate CNF instantiation.

For each incoming request handled by NFV Deployment Catalyst 270 (e.g., properly resolved or unresolved), NFV Deployment Catalyst 270 may provide a resolution record 456 to local deployment policy repository 440. For example, in some cases, NFV Deployment Catalyst 270 may not be able to correctly insert missing labels or otherwise address events/deficiencies with a CNF package. Records in deployment policy repository 440 may be collected for offline or real-time analysis and learning 457 by analytics platform 410 and used, for example, to improve policy evaluation and initial risk evaluation for requests at onboarding.

Although communications in FIG. 4 are shown as direct links, in other implementations, some communications between functions in network portion 400 may use indirect links. For example, a message bus may be used for one or more of corrected Resource Creation Request 454, information 455, and resolution record 456. The message bus may include, for example, a Data Movement as a Platform (DMaaP) system that provides a data movement service to transport and process data from a source (i.e., a "producer") to a target (i.e., a "consumer").

Figure 5:
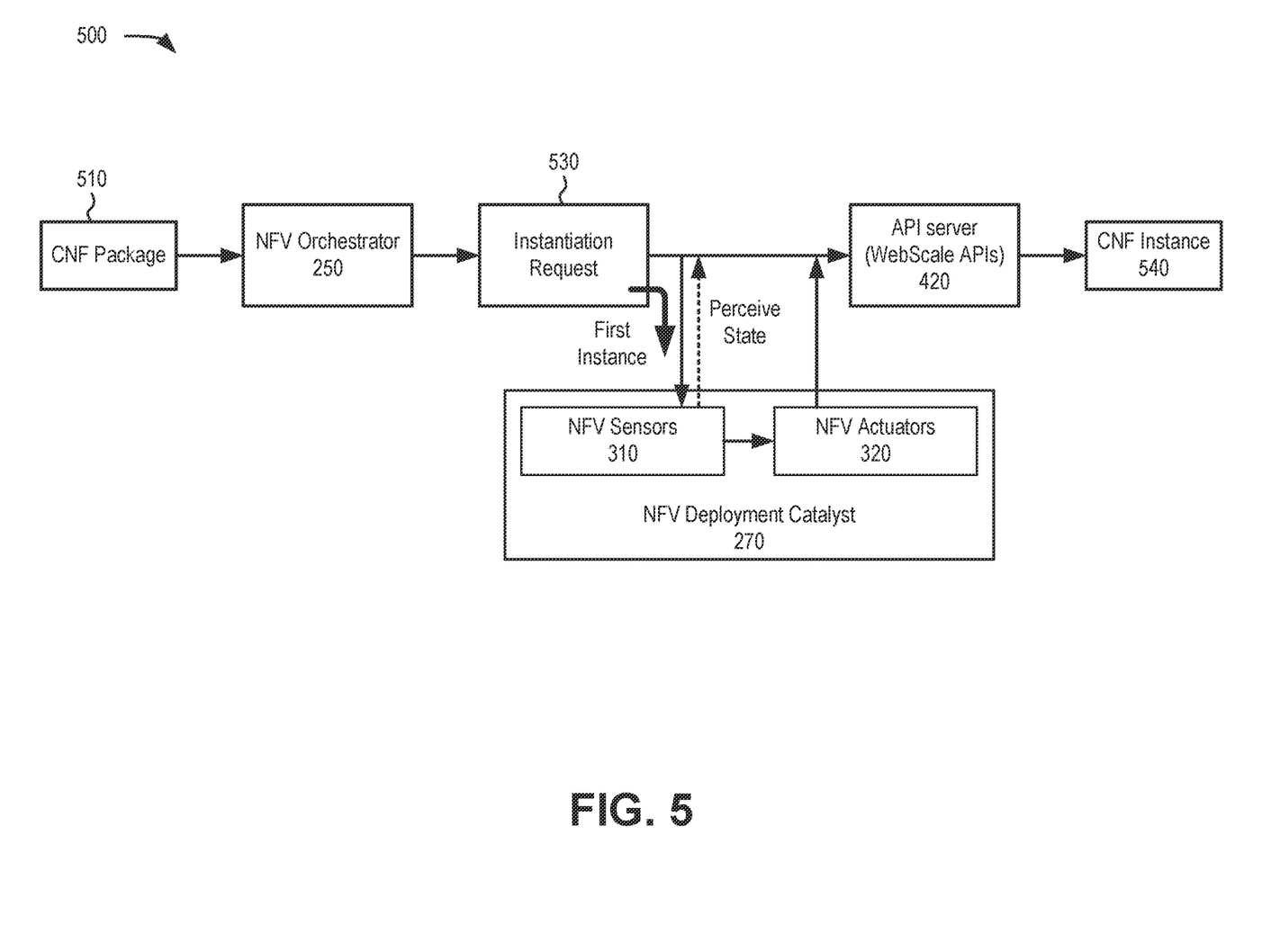
FIG. 5 is a diagram illustrating a CNF deployment flow using the NFV Deployment Catalyst of FIG. 3, according to an implementation.

FIG. 5 illustrates a CNF deployment flow 500 using NFV Deployment Catalyst 270, according to an implementation for admission control. As shown in FIG. 5, a CNF package 510 may be delivered to an NFV Orchestrator 250. NFV Orchestrator 250 may perform deployment preparations and certify the CNF package to an orchestration-ready package (e.g., including a risk assessment). NFV Orchestrator 250 may generate an instantiation request 530 for the CNF package (e.g., which propagates the CNF package) and send the instantiation request 530 to an appropriate API server 420. If instantiation request 530 is a first instance (e.g., first request from a data center for a particular customer/application), sensor 310 may be activated to apply admission controls and select NFV actuators 320 for any needed remedial measures, such as described in connection with FIGS. 3 and 4. The instantiation request with the corrected/validated CNF package information may then be forwarded to API server 420 for instantiation of CNF instance 540. Through feedback from NFV Deployment Catalyst 270, orchestrator 250/CISM 260 may improve subsequent instantiation requests 530 from the same customer/application. Thus, subsequent instantiation requests 530 may be forwarded directly to API server 420 for instantiation of CNF instance 540.

Figure 6:
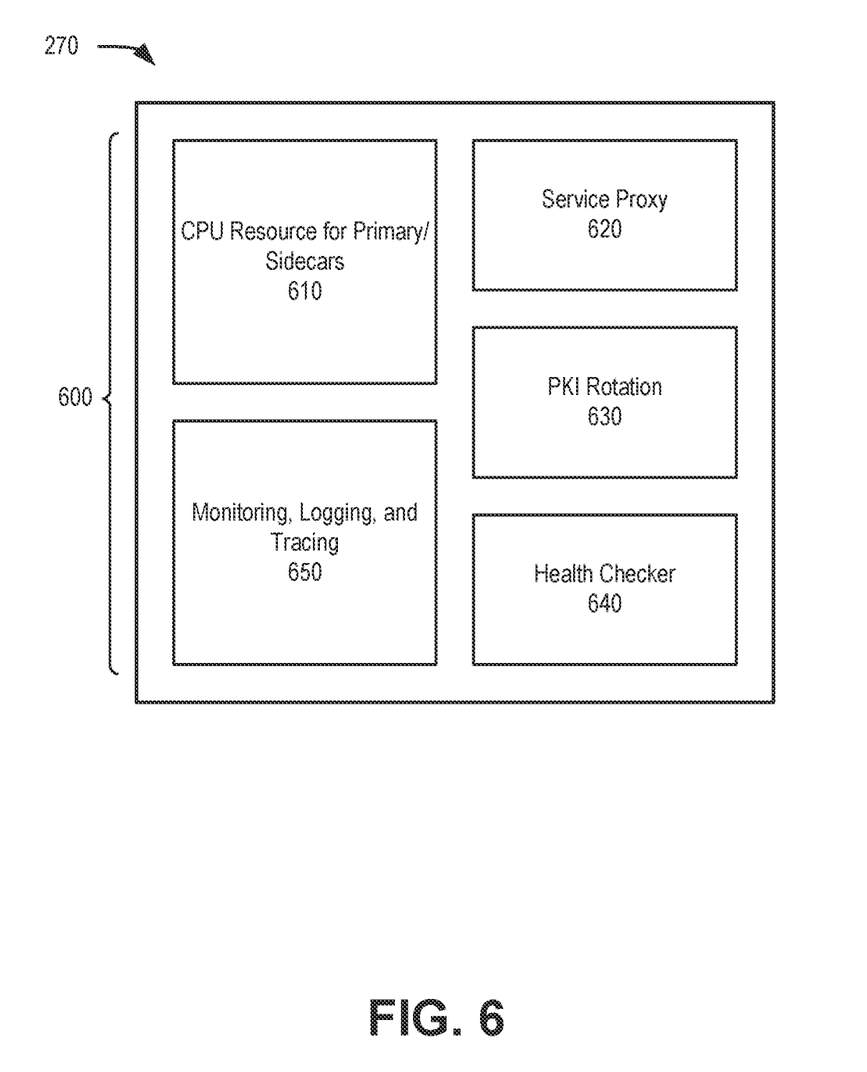
FIG. 6 is a diagram illustrating exemplary variations and/or customizations that may be managed via NFV Deployment Catalyst of FIG. 3.

FIG. 6 illustrates exemplary variations and/or customizations that may be managed via NFV Deployment Catalyst 270. More particularly, different extensions 600 may be employed in NFV Deployment Catalyst 270. Depending on the type of sensor 310, some sensors 310 may operate during admission control policies and other sensors 310 may operate as CRD controllers during runtime to monitor events.

CPU resource for primary/sidecars extension 610 addresses a current limitation where the cloud platform (e.g., WebScale platform) expects the containers to define the resource requirements for CPU/memory (MEM) resource. The total CPU/MEM resource quota of a CNF may be configured at the namespaces level. The sidecars are containers that are injected during runtime. Vendor parameters included in their corresponding helm charts (e.g., settings that describe a set of Kubernetes resources) may not include such sidecar parameters. CPU resource for primary/sidecars extension 610 may perform verification and validation of the presence of virtual CPU resource request/requirements for the sidecars (if not defined in the helm chart). CPU Resource for Primary/Sidecars extension 610 would intercept the API call to the API server 420 (e.g., Kubernetes server) to probe the presence of resource definitions and/or validate the presence of labels/annotations. If not present, then CPU Resource for Primary/Sidecars extension 610 may ingest the defaults resource CPU/memory requirements or labels/annotations.

Service proxy extension 620 addresses a current limitation where the cloud platform (e.g., an OpenShift-based platform of provider network 120) recommends including certain naming standards and mandatory labels in the CNF package required for service-proxy-related configurations to allow CNFs to have any external communication. Service proxy extension 620 may perform verification and validation of the presence of the labels defined in the Platform as a Service (PaaS) CNF Service Descriptor or the Container Infrastructure Service (CIS) declarative descriptor to enable the Service Proxy communications. Service proxy extension 620 may intercept the CNF instantiation API requests to the API server 420 to probe the presence of resource definitions and/or validate the presence of labels/annotations. If not present, service proxy extension 620 may ingest the default resource CNF naming standards or labels/annotations as defined in the configuration policies.

PKI rotation extension 630 may provide for auto-rotation of PKI certificates for the CNFs that do not have service based interfaces. PKI rotation extension 630 may verify the presence of specialized annotations for those computing resources that do not require service based interfaces for communication with external applications. If annotations are present, PKI rotation extension 630 may detect the Kubernetes-secrets (for PKI). PKI rotation extension 630 may poll the timestamp of the PM certificates and notify the orchestrator to re-issue the certificate from the PKI infrastructure and update the secrets created in the namespace.

Health checker extension 640 may probe the health check of a CNF application. Health checker extension 640 may verify the presence of the specialized health-checker annotations for those computing resources that are necessary components of the 5G Core (e.g., core network 130). Health checker extension 640 may subscribe the health status notification of the CNF microservice. Based on the threshold rule defined in the policy template, if Kubernetes is unable to heal the application, then Health checker extension 640 may send a notification to an upstream system (e.g., external systems 430) to take corrective action.

Monitoring, logging, and tracing extension 650 may verify and validate the presence of labels for CNF monitoring and tracing related operations and events. Monitoring, logging, and tracing extension 650 may auto-inject the missing labels, as necessary.

While FIG. 6 illustrates examples of extensions 600 may be employed in NFV Deployment Catalyst 270, in other implementations, NFV Deployment Catalyst 270 may include fewer, different, or additional extensions 600.

Figure 7:
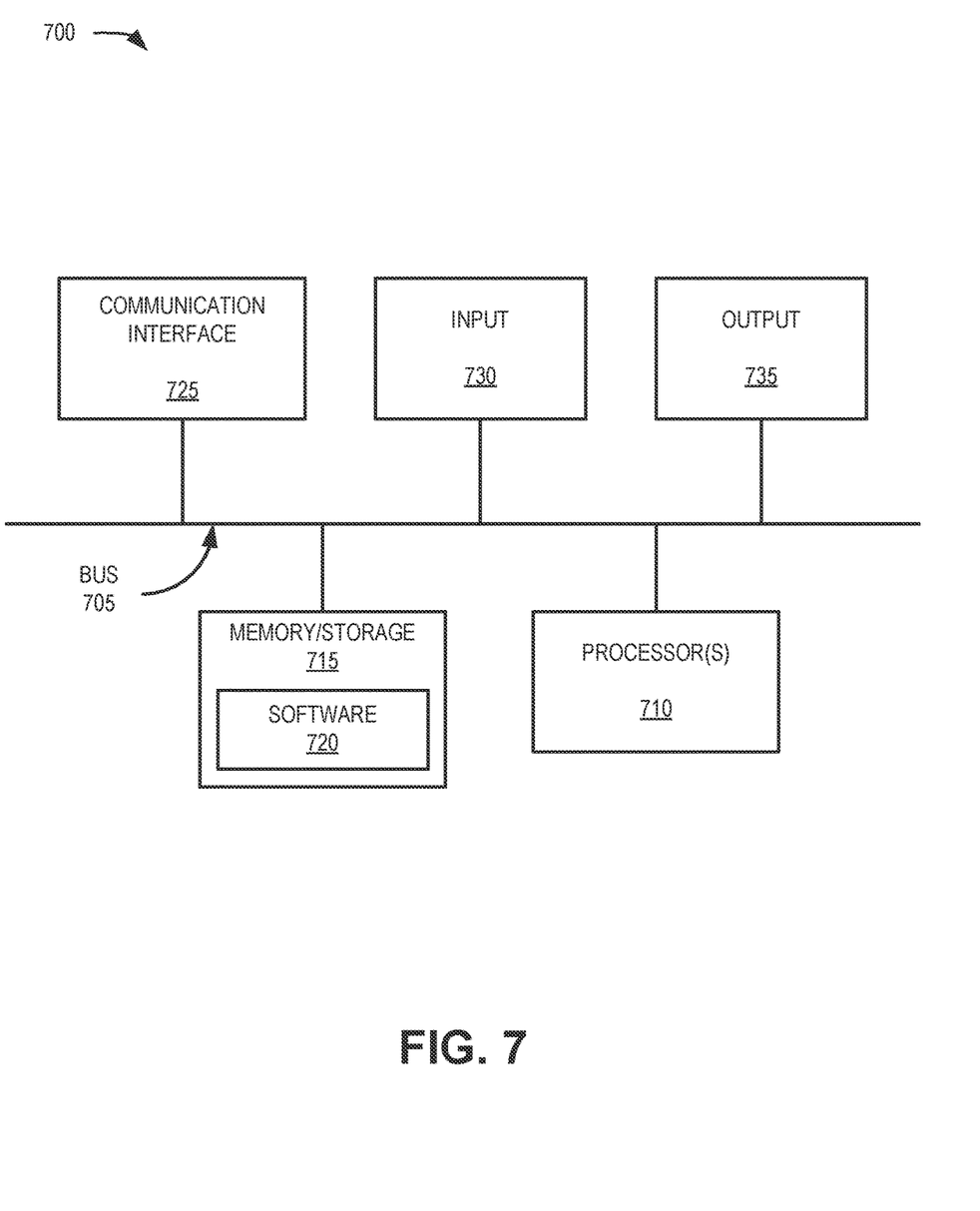
FIG. 7 is a diagram illustrating exemplary components of a device that may correspond to one or more of the devices described herein.

FIG. 7 is a diagram illustrating exemplary components of a device 700 that may correspond to one or more of the devices described herein. For example, device 700 may correspond to components included in access network 110, provider network 120, core network 130, orchestrator 250, CISM 260, NFV deployment catalyst 270, and/or other elements illustrated in FIGS. 1-6. As illustrated in FIG. 7, according to an exemplary embodiment, device 700 includes a bus 705, one or more processors 710, memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, and/or clocks.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc. Processor 710 may be a dedicated component or a non-dedicated component (e.g., a shared resource).

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include a drive for reading from and writing to the storage medium.

Memory/storage 715 may be external to and/or removable from device 700, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. Software 720 may include an operating system. Software 720 is also intended to include firmware, middleware, microcode, hardware description language (HDL), and/or other forms of instruction. For example, according to an implementation, software 720 may implement portions of NFV deployment catalyst 270.

Communication interface 725 permits device 700 to communicate with other devices, networks, systems, devices, and/or the like. Communication interface 725 includes one or multiple wireless interfaces and/or wired interfaces. For example, communication interface 725 may include one or multiple transmitters and receivers, or transceivers (e.g., radio frequency transceivers). Communication interface 725 may include one or more antennas. For example, communication interface 725 may include an array of antennas. Communication interface 725 may operate according to a protocol stack and a communication standard. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 735 permits an output from device 700. For example, output 735 may include a speaker, a display, a light, an output port, and/or some other type of visual, auditory, tactile, etc., output component. According to some embodiments, input 730 and/or output 735 may be a device that is attachable to and removable from device 700.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
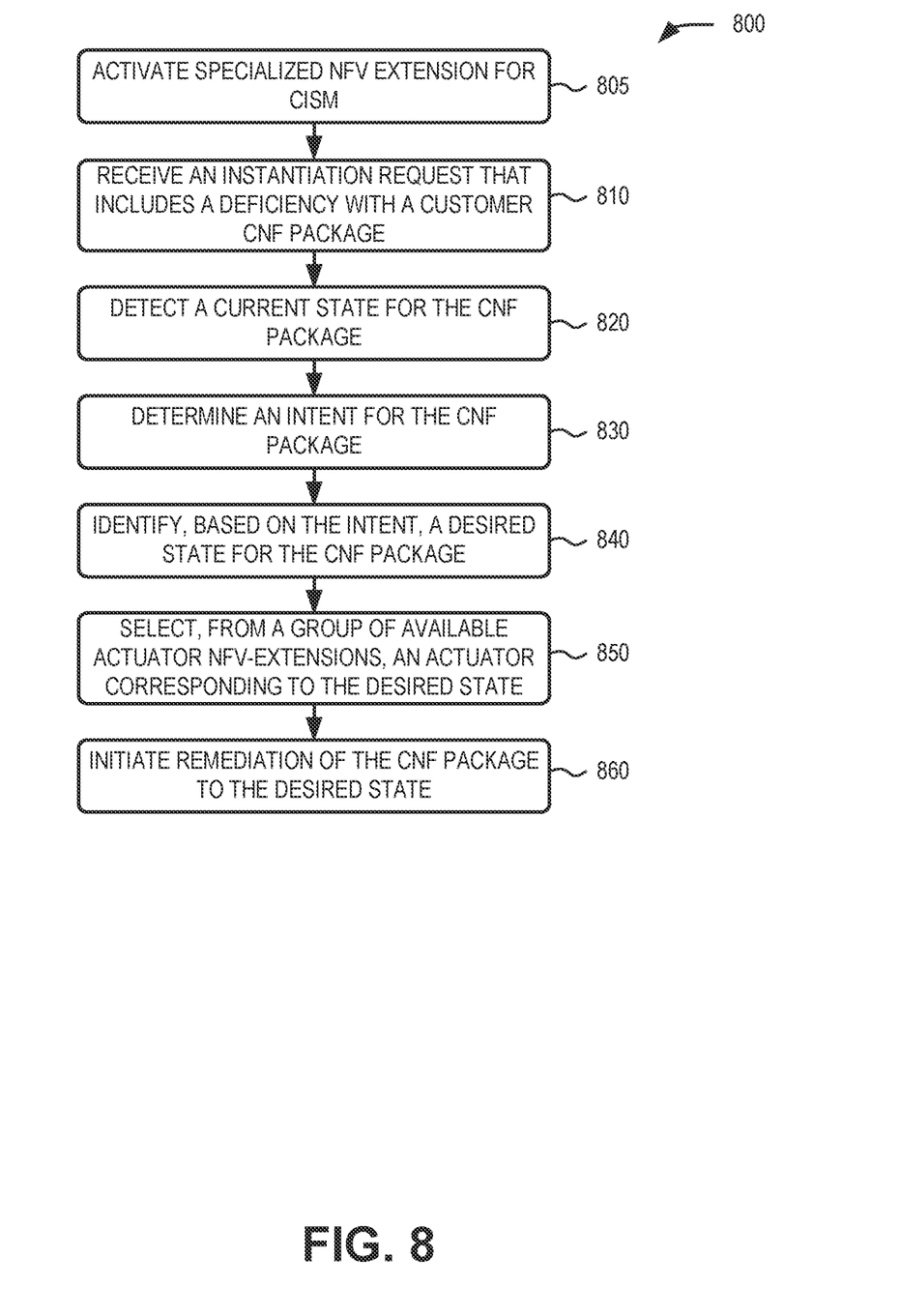
FIG. 8 is a flow diagram illustrating an exemplary process for performing CNF deployment validation, according to an implementation described herein.

FIG. 8 is a flow diagram illustrating an exemplary process 800 for performing CNF deployment validation, according to an implementation described herein. In one implementation, process 800 may be implemented by NFV Deployment Catalyst 270. In another implementation, process 800 may be implemented by NFV Deployment Catalyst 270 in conjunction with one or more other devices in virtualization orchestration platform 200.

Process 800 may include activating a specialized NFV extension for a CISM (block 805), receiving an instantiation request that includes a deficiency with a customer CNF package (block 810). For example, one or more NFV extensions 600 for NFV Deployment Catalyst 270 may be installed in VNF layer 220 of virtualization orchestration platform 200. CISM 260 may direct an instantiation call, for a CNF package, to API server 420, for example. NFV Deployment Catalyst 270 may intercept the instantiation call.

Process 800 may also include detecting a current state for the CNF package (block 820), determining an intent for the CNF package (block 830), and identify, based on the intent, a desired state for the CNF package (block 840). For example, one of sensors 310 may determine the current state of the network environment, such as what labels/annotations are currently included in the CNF package. Sensor 310 may inspect the instantiation request to determine if an intent is defined and determine what the desired state for the intent is, such as what are the appropriate default labels or annotations for a particular intent.

Process 800 may further include selecting, from a group of available actuator NFV-extensions, an actuator corresponding to the desired state (block 850), and initiate remediation of the CNF package to the desired state (bock 860). For example, a sensor 310 may be associated with one or more actuators 320 to provide remediation for a specific type of deficiency in a CNF package. Sensor 310 may identify the appropriate actuator 320 to convert the CNF package from the current state to the desired state for a particular intent. The selected actuator 320 may provide appropriate remediation.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 8, and message/operation/deployment flows with respect to FIGS. 3-5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    obtaining, by a network device including a sensor Network Function Virtualization (NFV)-extension, an instantiation request, which includes a deficient Containerized Network Function (CNF) package, from a Container Infrastructure Service Manager (CISM);
    detecting, by the sensor NFV-extension, a current state for the deficient CNF package in the instantiation request, wherein the detecting includes inspecting for labels, annotations, and public key infrastructure (PKI) settings in the deficient CNF package;
    determining, by the sensor NFV-extension, an intent for the deficient CNF package in the instantiation request;
    identifying, by the sensor NFV-extension and based on the intent, a desired state for the deficient CNF package in the instantiation request;
    selecting, by the sensor NFV-extension and from a plurality of available actuator NFV-extensions, an actuator NFV-extension corresponding to the desired state; and
    initiating, by the selected actuator NFV-extension, remediation of the deficient CNF package in the instantiation request to achieve the desired state,
    wherein the sensor NFV-extension and the actuator NFV-extension are executed in a deployment process flow between sending the instantiation request to an application programming interface (API) server and receiving the instantiation request by the API server.

2. The method of claim 1, wherein determining the intent for the deficient CNF package, further comprises:
    accessing a deployment policy repository.

3. The method of claim 1 wherein, when obtaining the instantiation request, the deficient CNF package includes a defect in:
    one of the labels or the annotations,
    one of the PKI settings, or
    a policy rule.

4. The method of claim 1, wherein the sensor NFV-extension and the actuator NFV-extension are managed objects in a VNF layer.

5. The method of claim 1, wherein obtaining the deficient CNF package includes intercepting a first instance of the instantiation request directed to the API server.

6. The method of claim 1, wherein initiating remediation of the deficient CNF package further comprises:
    performing automated remediation of the deficient CNF package,
    providing a notification of the deficient CNF package, or
    performing admission control for the instantiation request containing the deficient CNF package.

7. The method of claim 1, wherein initiating remediation of the deficient CNF package to the desired state further comprises:
    inserting a missing label or a missing annotation into the deficient CNF package.

8. A computing device, comprising:
    a communication interface to communicate with network devices; and
    one or more processors including:
        a sensor Network Function Virtualization (NFV)-extension configured to:

obtain, from a Container Infrastructure Service Manager (CISM), an instantiation request, which includes a deficient Containerized Network Function (CNF) package, detect a current state for the deficient CNF package in the instantiation request, wherein the detecting includes inspecting for labels, annotations, and public key infrastructure (PKI) settings in the deficient CNF package, determine an intent for the deficient CNF package in the instantiation request, identify, based on the intent, a desired state for the deficient CNF package in the instantiation request, and select, from a plurality of available actuator NFV-extensions, an actuator NFV-extension corresponding to the desired state; and the actuator NFV-extension configured to:

initiate remediation of the deficient CNF package in the instantiation request to achieve the desired state, wherein the sensor NFV-extension and the actuator NFV-extension are executed in a deployment process flow between sending the instantiation request to an application programming interface (API) server and receiving the instantiation request by the API server.

9. The computing device of claim 8, wherein, when determining the intent for the deficient CNF package, the sensor NFV-extension is further configured to:

access a deployment policy repository.

10. The computing device of claim 8, wherein the sensor NFV-extension is one of an admissions controller or a custom resource definition controller.

11. The computing device of claim 8, wherein, when obtained by the sensor NFV-extension, the deficient CNF package includes a defect in:

a CNF naming standard,
one of the labels or the annotations,
a public key infrastructure, or
a policy rule.

12. The computing device of claim 8, wherein the sensor NFV-extension and the actuator NFV-extension are managed objects in a VNF layer.

13. The computing device of claim 8, wherein, when obtaining the deficient CNF package, the sensor NFV-extension is further configured to:

intercept a first instance of an instantiation request directed to the API server.

14. The computing device of claim 8, wherein, when initiating remediation of the deficient CNF package to the desired state, the actuator NFV-extension is further configured to:

perform automated remediation of the deficient CNF package,
provide a notification of the deficient CNF package, or
perform admission control for the instantiation request containing the deficient CNF package.

15. The computing device of claim 8, wherein, when initiating remediation of the deficient CNF package to the desired state, the actuator NFV-extension is further configured to:

insert a missing label or a missing annotation into the deficient CNF package.

16. A non-transitory computer-readable medium containing instructions executable by at least one processor, the computer-readable medium comprising one or more instructions for:

obtaining, by a network device including a sensor Network Function Virtualization (NFV)-extension, an instantiation request, which includes a deficient Containerized Network Function (CNF) package, from a Container Infrastructure Service Manager (CISM);

detecting, by the sensor NFV-extension, a current state for the deficient CNF package in the instantiation request, wherein the detecting includes inspecting for labels, annotations, and public key infrastructure (PKI) settings in the deficient CNF package;

determining, by the sensor NFV-extension, an intent for the deficient CNF package in the instantiation request;

identifying, by the sensor NFV-extension and based on the intent, a desired state for the deficient CNF package in the instantiation request;

selecting, by the sensor NFV-extension and from a plurality of available actuator NFV-extensions, an actuator NFV-extension corresponding to the desired state; and initiating, by the selected actuator NFV-extension, remediation of the deficient CNF package in the instantiation request to achieve the desired state, wherein the sensor NFV-extension and the actuator NFV-extension are executed in a deployment process flow between sending the instantiation request to an application programming interface (API) server and receiving the instantiation request by the API server.

17. The non-transitory computer-readable medium of claim 16, wherein the sensor plugin and the actuator plugin are managed objects in a VNF layer.

18. The non-transitory computer-readable medium of claim 16, wherein the instructions for obtaining the instantiation request further comprise instructions for:

intercepting a first instance of the instantiation request directed to the API server.

19. The non-transitory computer-readable medium of claim 16, wherein the sensor NFV-extension is one of an admissions controller or a custom resource definition controller.

20. The non-transitory computer-readable medium of claim 16, wherein the deficient CNF package includes a defect in:

one of the labels or the annotations,
one of the PKI settings, or
a policy rule.

* * * * *